United States Patent
Khan

(10) Patent No.: US 9,014,646 B2
(45) Date of Patent: *Apr. 21, 2015

(54) ELECTRONIC DEVICE WITH MULTIPLE ANTENNA DIVERSITY AND RELATED METHODS

(71) Applicant: BlackBerry Limited, Waterloo (CA)

(72) Inventor: Nasserullah Khan, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/138,545

(22) Filed: Dec. 23, 2013

(65) Prior Publication Data

US 2014/0106682 A1  Apr. 17, 2014

Related U.S. Application Data

(63) Continuation of application No. 13/359,988, filed on Jan. 27, 2012, now Pat. No. 8,655,288.

(51) Int. Cl.
| | |
|---|---|
| *H03C 7/02* | (2006.01) |
| *H04B 7/04* | (2006.01) |
| *H04W 88/02* | (2009.01) |
| *H01Q 1/24* | (2006.01) |

(52) U.S. Cl.
CPC ............. *H04B 7/0404* (2013.01); *H04W 88/02* (2013.01); *H01Q 1/242* (2013.01)

(58) Field of Classification Search
USPC ...................................... 455/101, 575.7, 557
See application file for complete search history.

(56) References Cited

U.S. PATENT DOCUMENTS

| | | |
|---|---|---|
| 8,363,744 B2 | 1/2013 | Agee et al. |
| 2003/0060218 A1 | 3/2003 | Billerbeck et al. |
| 2007/0001908 A1 | 1/2007 | Fager et al. |
| 2008/0094283 A1 | 4/2008 | Mei |
| 2008/0194302 A1 | 8/2008 | Castaneda et al. |
| 2009/0033574 A1 | 2/2009 | Hung |
| 2010/0093282 A1 | 4/2010 | Martikkala et al. |
| 2011/0002496 A1 | 1/2011 | Meesters |
| 2011/0105049 A1 | 5/2011 | Yamada et al. |
| 2011/0143673 A1 | 6/2011 | Landesman et al. |

(Continued)

FOREIGN PATENT DOCUMENTS

| | | |
|---|---|---|
| EP | 0573856 | 12/1993 |
| EP | 1672817 | 6/2006 |

OTHER PUBLICATIONS

"Amplifier Installation Guide", Wilson Electronics, Inc., 2007, pp. 1-12.

*Primary Examiner* — Creighton Smith
(74) *Attorney, Agent, or Firm* — Allen, Dyer, Doppelt, Milbrath & Gilchrist, P.A.

(57) ABSTRACT

An electronic device may include a mobile wireless communications device having a first housing, a spatial diversity wireless transceiver carried by the first housing, and a first antenna carried by the first housing and coupled to the spatial diversity wireless transceiver. The electronic device may include an external antenna device having a second housing, and a second antenna carried thereby and configured to be coupled to the spatial diversity wireless transceiver. The spatial diversity wireless transceiver may be configured to selectively operate one of the first antenna and the second antenna to provide spatial diversity.

23 Claims, 5 Drawing Sheets

(56) References Cited

U.S. PATENT DOCUMENTS

2012/0229588 A1 9/2012 Greenfield
2013/0051601 A1 2/2013 Hill et al.

ELECTRONIC DEVICE WITH MULTIPLE ANTENNA DIVERSITY AND RELATED METHODS

TECHNICAL FIELD

This application relates to the field of communications, and more particularly, to wireless communications systems and related methods.

BACKGROUND

Cellular communication systems continue to grow in popularity and have become an integral part of both personal and business communications. Cellular telephones allow users to place and receive phone calls almost anywhere they travel. Moreover, as cellular telephone technology is improved, so too has the functionality of cellular devices. For example, many cellular devices now incorporate Personal Digital Assistant (PDA) features such as calendars, address books, task lists, calculators, memo and writing programs, etc. These multi-function devices usually allow users to wirelessly send and receive electronic mail (email) messages and access the Internet via a cellular network and/or a wireless local area network (WLAN), for example.

As the functionality of cellular devices continues to increase, so too does demand for smaller devices that are easier and more convenient for users to carry. Nevertheless, the move towards multi-functional devices makes miniaturization more difficult as the requisite number of installed components increases. Indeed, the typical cellular device may include several antennas, for example, a cellular antenna, a global positioning system antenna, and a WiFi IEEE 802.11g antenna. These antennas may comprise external antennas and internal antennas.

Generally speaking, internal antennas allow cellular devices to have a smaller footprint. Moreover, they are also preferred over external antennas for mechanical and ergonomic reasons. Internal antennas are also protected by the cellular device's housing and therefore tend to be more durable than external antennas. External antennas may be cumbersome and may make the cellular device difficult to use, particularly in limited-space environments. Yet, one potential drawback of typical internal antennas is that they are in relatively close proximity to the user's head when the cellular device is in use, thereby increasing the specific absorption rate (SAR). Also, other components within the cellular device may cause interference with the internal antenna.

DETAILED DESCRIPTION OF THE PREFERRED EMBODIMENTS

Figure 1:
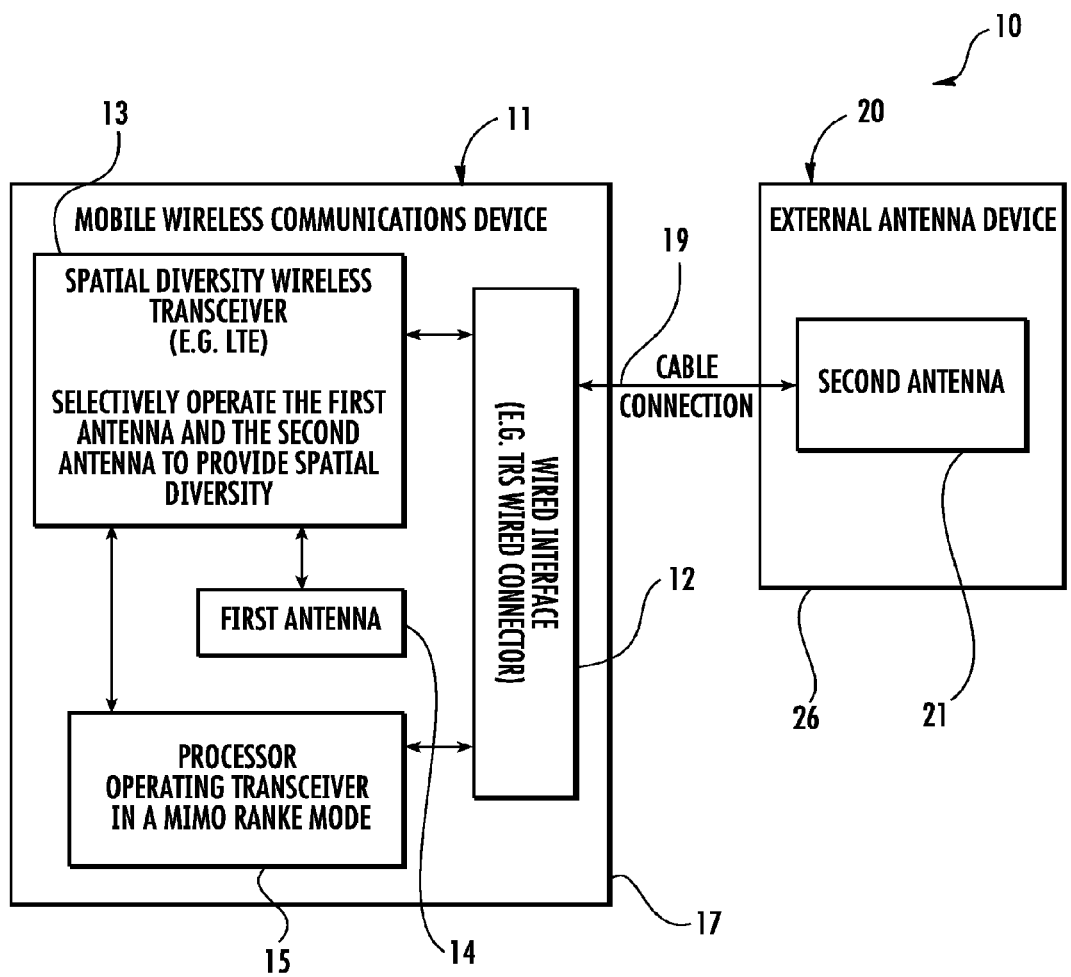
FIG. 1 is a schematic block diagram of an example embodiment of an electronic device.

The present description is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

Generally speaking, an electronic device may include a mobile wireless communications device comprising a first housing, a spatial diversity wireless transceiver carried by the first housing, and at least one first antenna carried by the first housing and coupled to the spatial diversity wireless transceiver. The electronic device may also include an external antenna device comprising a second housing, and at least one second antenna carried thereby and configured to be coupled to the spatial diversity wireless transceiver. The spatial diversity wireless transceiver may be configured to selectively operate the at least one first antenna and the at least one second antenna to provide spatial diversity.

The mobile wireless communications device may comprise an interface carried by the first housing, coupled to the spatial diversity wireless transceiver, and configured to couple the spatial diversity wireless transceiver to the at least one second antenna. In some embodiments, the interface may comprise a connector carried by the first housing and coupled to the spatial diversity wireless transceiver, and the external antenna device may comprise a cable extending from the second housing and configured to be coupled between the at least one second antenna and the connector. For example, the connector may comprise a tip ring sleeve (TRS) connector carried by an external surface of the first housing.

In other embodiments, the interface may comprise a wireless local area networking (WLAN) transceiver configured to wirelessly couple the at least one second antenna to the spatial diversity wireless transceiver. For example, the interface may comprise a Bluetooth wireless transceiver configured to wirelessly couple the at least one second antenna to the spatial diversity wireless transceiver.

The mobile wireless communications device may comprise a processor configured to operate the spatial diversity wireless transceiver in a first multiple-input/multiple-output (MIMO) rank mode when the at least one second antenna is not connected to the spatial diversity wireless transceiver. The processor may be configured to operate the spatial diversity wireless transceiver in a second MIMO rank mode when the at least one second antenna is connected to the spatial diversity wireless transceiver, the second MIMO rank mode being greater than the first MIMO rank mode.

For example, the spatial diversity wireless transceiver may comprise a cellular 3GPP Long Term Evolution (LTE) transceiver. The at least one first antenna may be internal with respect to the first housing, and the at least one second antenna may be internal with respect to the second housing.

Another aspect is directed to a method of providing spatial diversity in an electronic device comprising a mobile wireless communications device including a first housing, a spatial diversity wireless transceiver carried by the first housing, and at least one first antenna carried by the first housing and coupled to the spatial diversity wireless transceiver. The method may include coupling an external antenna device comprising a second housing, and at least one second antenna carried thereby to the spatial diversity wireless transceiver, and using the spatial diversity wireless transceiver to selectively operate the at least one first antenna and the at least one second antenna to provide the spatial diversity.

Figure 2:
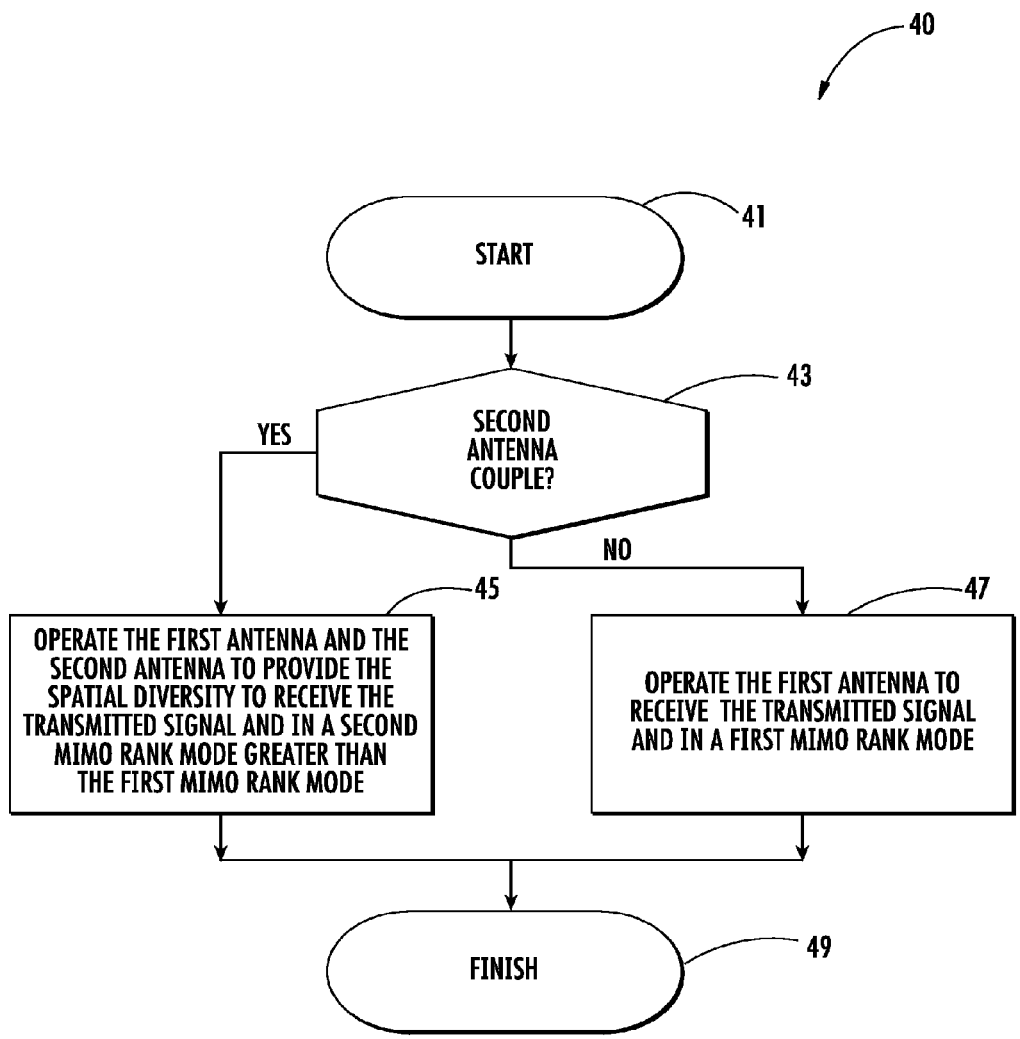
FIG. 2 is a flowchart illustrating operation of an example embodiment of an electronic device.

Referring now to FIG. 1, an electronic device 10 according to the present disclosure is now described. Moreover, with reference additionally to FIG. 2, a flowchart 40 illustrates a method of operating the electronic device 10 (Block 41). The electronic device 10 illustratively includes a mobile wireless communications device 11, and an external antenna device 20. Example mobile wireless communications devices may include portable or personal media players (e.g., music or MP3 players, video players, etc.), remote controls (e.g., television or stereo remotes, etc.), portable gaming devices, portable or mobile telephones, smartphones, tablet computers, etc. The mobile wireless communications device 11 includes a first housing 17, a spatial diversity wireless transceiver 13 carried by the first housing, and a first antenna 14 carried by the first housing and coupled to the spatial diversity wireless transceiver. For example, the spatial diversity wireless transceiver 13 may comprise a cellular 3GPP LTE transceiver, and/or an IEEE 802.16 WiMAX transceiver.

The first antenna 14 may comprise a multi-band antenna, for example, including a plurality of tuning elements, patch structures, and slot structures. In the illustrated embodiment, the mobile wireless communications device 11 includes one first antenna 14, but in other embodiments, there may be a plurality of first antennas. The first antenna 14 is shown as being internal with respect to the first housing 17, but may be, in other embodiments, external to the first housing.

Figure 3:
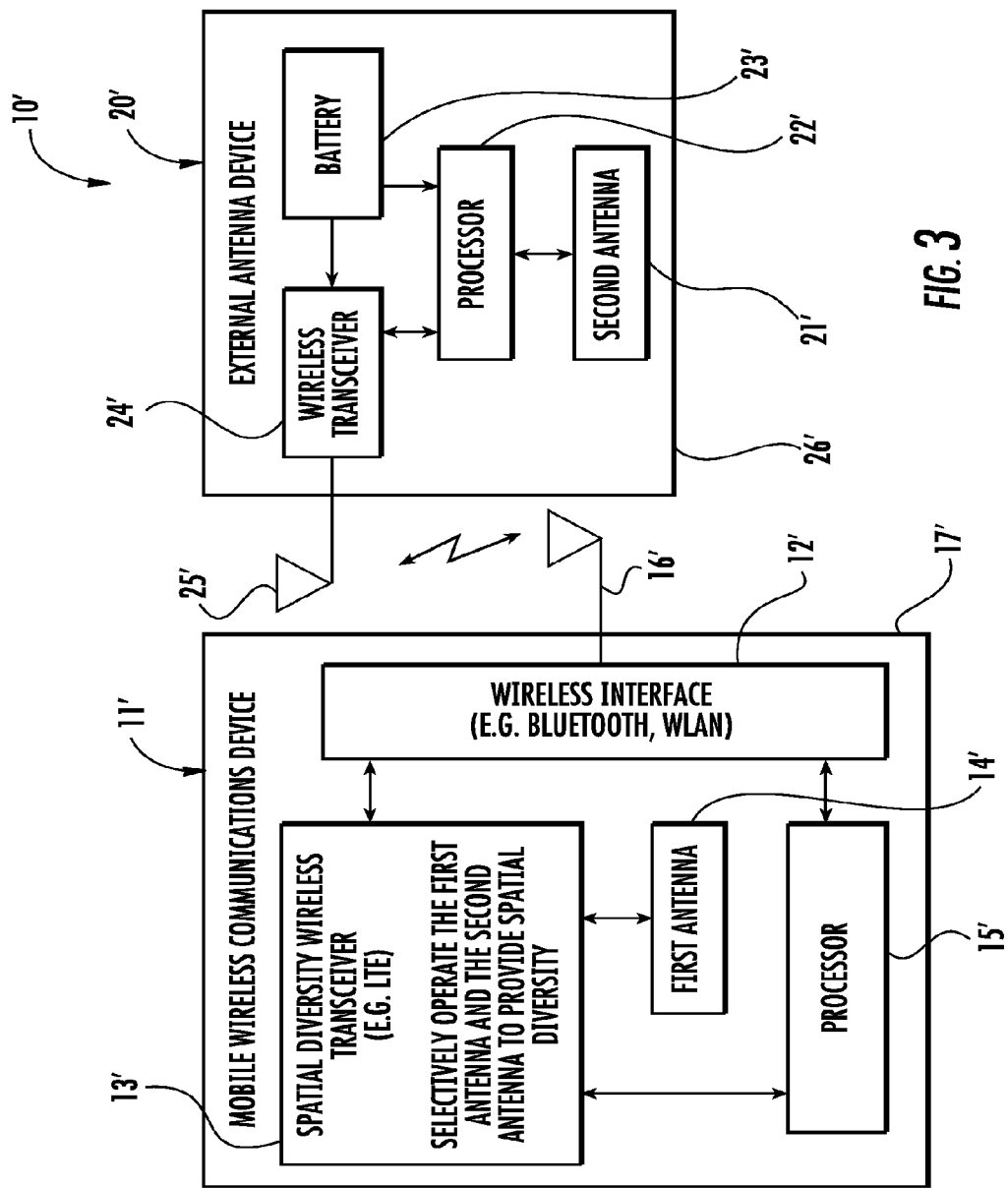
FIG. 3 is a schematic block diagram of another example embodiment of an electronic device.

The mobile wireless communications device 11 also illustratively includes a processor 15 coupled to the spatial diversity wireless transceiver 13 and configured to generate data for transmission for the transceiver. For example, the processor 15 may include a single/multi core structure. The mobile wireless communications device 11 also illustratively includes an interface 12, shown as a wired interface, coupling the spatial diversity wireless transceiver 13 and the external antenna device 20. Of course, in other embodiments, the interface 12 may comprise a wireless interface (FIG. 3).

Figure 4:
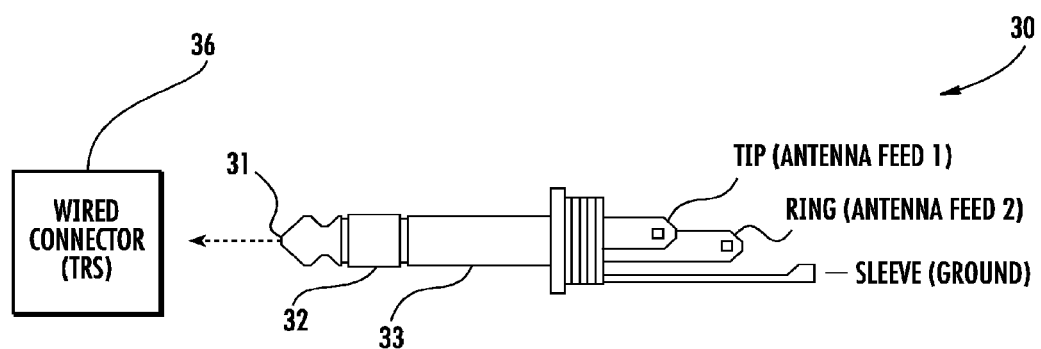
FIG. 4 is a schematic diagram of an example embodiment of the wired connector from FIG. 1.

Referring briefly to FIG. 4, in some embodiments, the wired interface 12 includes a connector 36 carried by the first housing 17 and coupled to the spatial diversity wireless transceiver 13. For example, the connector 36 may comprise a TRS connector carried by an external surface of the first housing 17. In other embodiments, the connector 36 may comprise any suitable connector. The TRS connector 36 is configured to receive a corresponding TRS connector from a cable 19 of the external antenna device 20, the cable connector comprising comprise a tip connector 31 configured to provide a connection to a first antenna feed, a ring connector 32 configured to provide a connection to a second antenna feed, and a sleeve connector 33 configured to provide a connection to a ground.

In some embodiments, the TRS connector 36 of the wired interface 12 is the same TRS connector utilized for coupling an external wired headset (not shown). In these embodiments, the processor 15 is configured to detect whether the external antenna device 20 or a wired headset is coupled to the TRS connect and to operate the spatial diversity wireless transceiver 13 accordingly. In yet other embodiments, the connector 36 may comprise a micro universal serial bus (USB) connector, or a mini USB connector.

The external antenna device 20 comprises a second housing 26, and a second antenna 21 carried thereby and configured to be coupled to the spatial diversity wireless transceiver 13 via the wired interface 12. In the illustrated embodiment, the second antenna 21 is internal with respect to the second housing 26, but like the first antenna 14, it also may be externally located.

Additionally, the external antenna device 20 comprises a cable connection 19 for coupling the external antenna device 20, in particular, the second antenna 21, to the wired interface 12. The cable connection 19 extends from the second housing 26 and is configured to be coupled between the second antenna 21 and the connector. The cable connection 19 is removably connected to the wired interface 12.

During operation of the electronic device 10, if the user desires improved antenna performance, the user may connect the cable connection from the external antenna device 20 to the wired interface 12 (Block 43). Once connected, the processor 15 and the spatial diversity wireless transceiver 13 are configured to selectively operate the first antenna 14 and the second antenna 21 to provide improved spatial diversity (Block 45). Otherwise, i.e. the external antenna device 20 is not connected, the spatial diversity wireless transceiver 13 is configured to operate normally, i.e. conducting communications using only the first antenna 14 (Block 43).

For example, if the user is about to activate a bandwidth intensive application on the mobile wireless communications device 11, such as video streaming (uplink and downlink) or operate the device as a mobile hotspot base station, the user would then connect the external antenna device 20. For improved performance, the external antenna device 20 should be positioned about 6-7 inches (LTE embodiments) from the mobile wireless communications device 11. Of course, the external antenna device 20 could be placed at any convenient length. The external antenna device 20 is configured to serve as an additional high band and low band antenna for the mobile wireless communications device 11, permitting it to operate in an LTE MIMO 4×4 (for high band) and 2×2 (in the low band) mode, for example. Advantageously, this may permit the electronic device 10 to offer improved data rates, range, and reliability without requiring additional bandwidth or transmit power. By using both first and second antennas 14, 21, the electronic device 10 may create multiple independent channels for sending multiple data streams.

As will be appreciated by those skilled in the art, some wireless communications protocols may support a plurality of MIMO rank modes. Operating in a higher ranked mode permits the device to operate with increased data throughput. Advantageously, the processor 15 is configured to operate the spatial diversity wireless transceiver 13 in a first MIMO rank mode when the second antenna 21 is not connected to the spatial diversity wireless transceiver, for example, an LTE MIMO 2×2 (in the high band) and 1×1 (in the low band) mode, and the processor is configured to operate the spatial diversity wireless transceiver in a second MIMO rank mode, for example, the aforementioned LTE MIMO 4×4 (in the high band) and 2×2 (in the low band) mode, when the second antenna is connected to the spatial diversity wireless transceiver. The second MIMO rank mode is greater than the first MIMO rank mode. In other words, when the second antenna 21 is connected to the spatial diversity wireless transceiver 13, the mobile wireless communications device experiences improved RF performance (Block 49) and greater data throughput.

Referring now to FIG. 3, another embodiment of the electronic device 10' is now described. In this embodiment of the electronic device 10', those elements already discussed above with respect to FIG. 1 are given prime notation and most require no further discussion herein. This embodiment differs from the previous embodiment in that the interface 12' includes a wireless interface comprising a WLAN transceiver (interface) configured to wirelessly couple the second antenna 21' to the spatial diversity wireless transceiver 13'. Moreover, the mobile wireless communications device 11' further includes an antenna 16' coupled to the wireless interface 12'. For example, the wireless interface 12' may comprise a Bluetooth wireless transceiver configured to wirelessly couple the second antenna 21' to the spatial diversity wireless transceiver 13'.

The external antenna device 20' also includes a wireless transceiver 24', and an antenna 25' cooperating therewith and for communicating with the wireless interface 12' of the mobile wireless communications device 11'. The external antenna device 20' also includes a processor 22' coupled between the second antenna 21' and the wireless transceiver 24'. In short, the processor coordinates the received data from the second antenna 21' and forwards it through the wireless transceiver 24' to the mobile wireless communications device 11. The external antenna device 20' also includes a battery 23' configured to power the wireless transceiver 24' and the processor 22'.

Another aspect is directed to a method of providing spatial diversity in an electronic device 10 comprising a mobile wireless communications device 11 including a first housing 17, a spatial diversity wireless transceiver 13 carried by the first housing, and at least one first antenna 14 carried by the first housing and coupled to the spatial diversity wireless transceiver. The method may include coupling an external antenna device 20 comprising a second housing 26, and at least one second antenna 21 carried thereby to the spatial diversity wireless transceiver 13, and using the spatial diversity wireless transceiver to selectively operate the at least one first antenna 14 and the at least one second antenna to provide the spatial diversity.

Example components of a mobile wireless communications device 1000 that may be used in accordance with the above-described embodiments are further described below with reference to FIG. 5. The device 1000 illustratively includes a housing 1200, a keyboard or keypad 1400 and an output device 1600. The output device shown is a display 1600, which may comprise a full graphic liquid crystal display (LCD). Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 5:
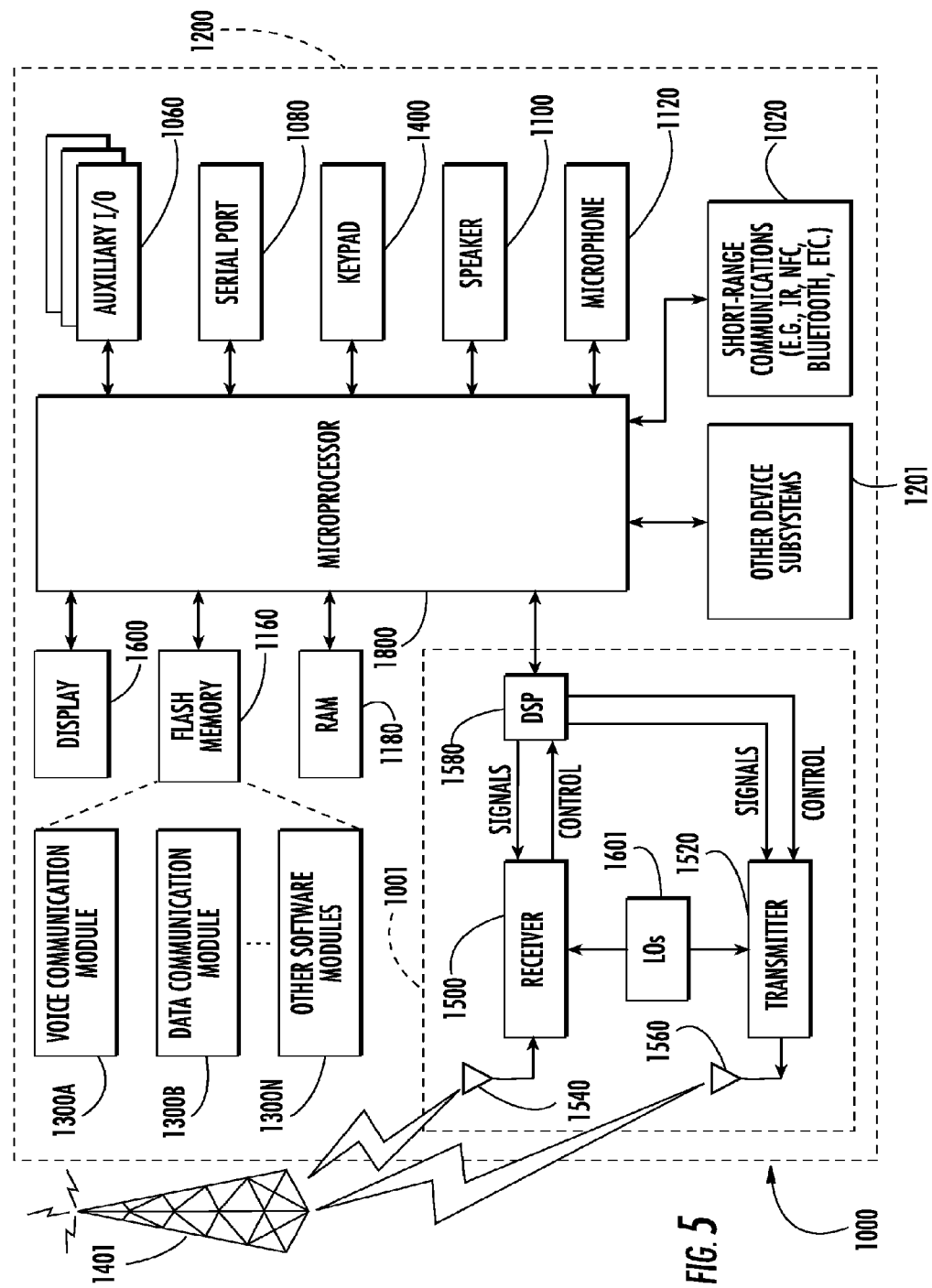
FIG. 5 is a schematic block diagram illustrating example components of a mobile wireless communications device that may be used with the electronic devices of FIGS. 1 and 3.

In addition to the processing device 1800, other parts of the mobile device 1000 are shown schematically in FIG. 5. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem 1020. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as Advanced Mobile Phone System (AMPS), time division multiple access (TDMA), code division multiple access (CDMA), Wideband code division multiple access (W-CDMA), personal communications service (PCS), GSM (Global System for Mobile Communications), enhanced data rates for GSM evolution (EDGE), etc. Other types of data and voice networks, both separate and integrated, may also be utilized with the mobile device 1000. The mobile device 1000 may also be compliant with other communications standards such as 3GSM, 3rd Generation Partnership Project (3GPP), Universal Mobile Telecommunications System (UMTS), 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a NFC sensor for communicating with a NFC device or NFC tag via NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed:

1. An electronic device comprising:
    a mobile wireless communications device comprising
        a first housing,
        a spatial diversity wireless transceiver carried by said first housing,
        at least one first antenna carried by said first housing, and
        an external antenna interface carried by said first housing and coupled to said spatial diversity wireless transceiver;
    an external antenna device comprising
        a second housing, and
        at least one second antenna carried by said second housing and coupled to said external antenna interface; and
    said spatial diversity wireless transceiver configured to operate said at least one first antenna and said at least one second antenna to provide spatial diversity;
    a processor configured to operate said spatial diversity wireless transceiver in a first mode when said at least one second antenna is not coupled to said spatial diversity wireless transceiver, and a second mode when said at least one second antenna is connected to said spatial diversity wireless transceiver, the second mode providing a greater data rate than the first mode.

2. The electronic device of claim 1 wherein said external antenna interface comprises a connector; and wherein said external antenna device comprises a cable extending from said second housing and configured to be coupled to said connector.

3. The electronic device of claim 2 wherein said connector comprises a tip ring sleeve (TRS) connector.

4. The electronic device of claim 2 wherein said connector comprises a USB connector.

5. The electronic device of claim 1 wherein said external antenna interface comprises a wireless interface.

6. The electronic device of claim 5 wherein said wireless interface comprises a wireless local area networking (WLAN) transceiver.

7. The electronic device of claim 5 wherein said wireless interface comprises a Bluetooth wireless transceiver.

8. The electronic device of claim 1 wherein the first mode comprises a first multiple-input/multiple-output (MIMO) rank mode.

9. The electronic device of claim 8 wherein the second mode comprises a second MIMO rank mode, the second MIMO rank mode being greater than the first MIMO rank mode.

10. The electronic device of claim 1 wherein said spatial diversity wireless transceiver comprises a cellular 3GPP Long Term Evolution (LTE) transceiver.

11. The electronic device of claim 1 wherein said at least one first antenna is internal with respect to said first housing; and wherein said at least one second antenna is internal with respect to said second housing.

12. A mobile wireless communications device comprising:
    a first housing;
    a spatial diversity wireless transceiver carried by said first housing;
    at least one first antenna carried by said first housing;
    an external antenna interface carried by said first housing and coupled to said spatial diversity wireless transceiver;
    said spatial diversity wireless transceiver configured to operate said at least one first antenna and at least one second antenna to provide spatial diversity, the at least one second antenna carried by a second housing; and
    a processor configured to operate said spatial diversity wireless transceiver in a first mode when the at least one second antenna is not coupled to said spatial diversity wireless transceiver, and a second mode when the at least one second antenna is connected to said spatial diversity wireless transceiver, the second mode providing a greater data rate than the first mode.

13. The mobile wireless communications device of claim 12 wherein said external antenna interface comprises a connector.

14. The mobile wireless communications device of claim 13 wherein said connector comprises a tip ring sleeve (TRS) connector.

15. The mobile wireless communications device of claim 13 wherein said connector comprises a USB connector.

16. The mobile wireless communications device of claim 12 wherein said external antenna interface comprises a wireless interface.

17. The mobile wireless communications device of claim 16 wherein said external antenna interface comprises a wireless local area networking (WLAN) transceiver.

18. The mobile wireless communications device of claim 16 wherein said external antenna interface comprises a Bluetooth wireless transceiver.

19. The mobile wireless communications device of claim 12 wherein said spatial diversity wireless transceiver comprises a cellular 3GPP Long Term Evolution (LTE) transceiver.

20. The mobile wireless communications device of claim 12 wherein said at least one first antenna is internal with respect to said first housing.

21. A method of providing spatial diversity in an electronic device comprising a mobile wireless communications device including a first housing, a spatial diversity wireless transceiver carried by the first housing, at least one first antenna carried by the first housing, and an external antenna interface carried by the first housing and coupled to the spatial diversity wireless transceiver, the method comprising:

coupling an external antenna device to the external antenna interface, the external antenna device comprising a second housing, and at least one second antenna carried by the second housing;

using the spatial diversity wireless transceiver to operate the at least one first antenna and the at least one second antenna to provide spatial diversity; and operating the spatial diversity wireless transceiver in a first mode when the at least one second antenna is not coupled to the spatial diversity wireless transceiver, and a second mode when the at least one second antenna is connected to the spatial diversity wireless transceiver, the second mode providing a greater data rate than the first mode.

22. The method of claim 21 wherein the interface comprises a connector.

23. The method of claim 21 wherein the interface comprises a wireless interface.

* * * * *